United States Patent [19]
Pfeiffer et al.

[11] Patent Number: 5,967,033
[45] Date of Patent: Oct. 19, 1999

[54] METHOD OF DETERMINING INK COVERAGE IN A PRINT IMAGE

[75] Inventors: Nikolaus Pfeiffer, Heidelberg; Manfred Schneider, Bad Rappenau, both of Germany; Hans Ott, Regensdorf, Switzerland

[73] Assignee: Heidelberger Druckmaschinen AG, Heidelberg, Germany

[21] Appl. No.: 09/185,122

[22] Filed: Nov. 3, 1998

[30] Foreign Application Priority Data

Nov. 6, 1997 [DE] Germany .............. 197 49 065

[51] Int. Cl.$^6$ .................... G01J 3/46; B41F 31/00
[52] U.S. Cl. .................... 101/211; 101/484
[58] Field of Search .................... 101/365, 211, 101/484, DIG. 45, DIG. 47; 702/108, 81; 382/112, 167, 165; 356/407, 408, 394; 364/917, 921, 921.3

[56] References Cited

U.S. PATENT DOCUMENTS

| | | | |
|---|---|---|---|
| 5,182,721 | 1/1993 | Kipphan et al. | 382/112 |
| 5,530,656 | 6/1996 | Six | 702/108 |
| 5,791,251 | 8/1998 | Kislter et al. | 101/484 |

FOREIGN PATENT DOCUMENTS

| | | |
|---|---|---|
| 0 228 347 B1 | 7/1987 | European Pat. Off. . |
| 228 347 | 10/1989 | European Pat. Off. . |
| 44 31 270 | 4/1995 | Germany . |
| 44 31 270 A1 | 4/1995 | Germany . |
| 195 15 499 | 10/1996 | Germany . |
| 195 15 499 A1 | 10/1996 | Germany . |
| 196 50 223 | 6/1998 | Germany . |
| 196 50 223 A1 | 6/1998 | Germany . |

*Primary Examiner*—J. Reed Fisher
*Attorney, Agent, or Firm*—Kenyon & Kenyon

[57] ABSTRACT

For determining the ink coverages of printing inks involved in printing in one pixel of a print image, the pixel is scanned photoelectrically in the visible range of the spectrum and also in the near infrared range. Color coordinates of a perceptually approximately equidistant color system and at least one infrared value are formed from the scanned signals thus obtained. The ink coverages of the printing inks involved in the printing are then calculated from these color coordinates and from the minimum of one infrared value and are allocated to the pixel.

12 Claims, 2 Drawing Sheets

METHOD OF DETERMINING INK COVERAGE IN A PRINT IMAGE

FIELD OF THE INVENTION

The present invention concerns a method of determining ink coverage of printing inks involved in printing a pixel of a print image.

RELATED TECHNOLOGY

Coloration in modern printing presses, in offset printing in particular, is regulated to advantage by color difference control. A typical control method using color difference control is described in European Patent No. B2-0 228 347 and German Patent No. 195 15 499 C2, for example. In this method, a printed sheet printed by the printing press is surveyed colorimetrically in a number of test areas with regard to a selected color coordinate system. The resulting color coordinates are used to calculate the color difference vectors to theoretical color coordinates based on the same color coordinate system. These color difference vectors are converted to layer thickness change vectors with the help of color value gradients, and the ink management of the printing press is controlled on the basis of the converted layer thickness change vectors obtained from the color difference vectors. The fields of ink control strips printed together with the actual print image are used as test areas.

Meanwhile, devices known as scanners have become known which make it possible to survey the total image content of a printed sheet colorimetrically or by spectrophotometry in a large number of relatively small pixels at a reasonable expense and in a very short period of time. These scanners offer in principle the prerequisites in terms of measurement technology for not only using jointly printed test strips for controlling the ink management of a printing press but also using the color information from all pixels of the entire actual print image for this purpose.

One difficulty with this procedure, known as in-image measurement, concerns the black content in four-color printing, because it is known that not only the black printing ink itself but also the superimposed chromatic colors contribute to the black content. For many applications, e.g., for an especially expedient method of determining the input quantities for coloration control of a printing press, it is necessary to determine the ink coverages of the printing inks involved in the printing. According to conventional methods, however, this cannot be done reliably using the aforementioned in-image measurement due to the great variety of print situations in the print image. Another difficulty is the enormous computation expense required for in-image measurement and thus the unreasonably long computation times associated with this in practice.

German Patent No. 44 31 270 C2 describes a method of controlling the ink management of an autotype printing press, where the ink coverage values are determined from color values and a measured infrared value. In this method, the black content is determined first directly from the infrared value. With the help of the black content, the measured color values are converted to mathematical color values without a black content. Then, using the Neugebauer equations, the ink coverage values of the primary colors CMY (cyan, magenta, yellow) are determined from this. One disadvantage of this method is that the ink coverages of black printing ink can only be determined inaccurately because the infrared value is also influenced by the ink coverages of the primary colors CMY. Conversion to mathematical color values is inaccurate because there is no linear relationship between black printing ink and the three primary color inks CMY.

SUMMARY OF THE INVENTION

Based on this related art, an object of the present invention is to improve upon a method of determining the ink coverages of the printing inks involved in printing in one pixel of a print image, with the pixel being scanned photoelectrically in the visible range of the spectrum and the ink coverages being derived from the scanning signals thus obtained, the method also be capable of being used for in-image measurement. The present invention should make it possible to determine the ink coverages of all the printing inks involved in printing, in particular, black printing ink as well, at any pixels of a print image. Another object of the present invention is to permit high-speed determination of ink coverages at a reasonable cost, thereby creating the prerequisites for implementing the technical computational feasibility of printing press control on the basis of measurements in the print image.

The present invention provides a method of determining the ink coverages of the printing inks involved in printing in one pixel of a print image, with the pixel being scanned photoelectrically in the visible range of the spectrum and the ink coverages being derived from the scanning signals thus obtained. The method is characterized in that color coordinates of a perceptually approximately equidistant color system are formed from the scanning signals in the visible range of the spectrum; the pixel is also scanned photoelectrically in the near infrared range of the spectrum; at least one infrared value is formed from the scanned signals of the infrared range; an additional color coordinate is defined from the infrared value; and the ink coverages of the printing inks involved in the printing are calculated from the color coordinates of the color system and from the additional color coordinate.

To determine the ink coverages of printing inks involved in printing a pixel in a print image, the pixel is surveyed photoelectrically by a known method using a suitable scanner, preferably by spectrophotometry. The resulting scanning values are sent to a computer, which calculates the desired ink coverages from them by the method according to the present invention as described below. Suitable scanners which permit spectrophotometric surveying of a printed sheet pixel by pixel in one or two dimensions are widely known in the graphics industry and therefore need no further explanation for those skilled in the art. An especially suitable scanner is described in detail in German Patent Application No. 196 50 223.3, for example.

A first important aspect of the present invention is that black printing ink is also included in determining ink coverages. Therefore, the pixel of the print image is surveyed not only in the visible spectral range (approximately 400–700 nm), as is customary, but also at at least one point in the near infrared, where only black printing ink has any absorption worth mentioning. The reflectance spectrum of the scanned pixel thus has reflectance values in the visible spectral range, typically 16 reflectance values at intervals of 20 nm, and one reflectance value in the near infrared range.

Color values (color coordinates, color vectors, color loci) are calculated with regard to a selected color space. A perceptually equidistant color space, typically approximately the L, a, b-color space according to the CIE (International Committee on Illumination). Calculation of L, a, b-color (CIELAB) values from the spectral reflectance values of the visible spectral range is standardized by the CIE and therefore requires no further explanation. The reflectance value in the near infrared is converted to an infrared value I, which corresponds qualitatively to the brightness value L of the color space. This is done by analogy with the equation for calculating L:

$$I = 116 \cdot \sqrt[3]{\frac{Ii}{Iin}} - 16$$

where $I_i$ denotes the infrared reflectance measured in the respective pixel, and $I_{in}$ denotes the infrared reflectance measured at an unprinted location on the printed sheet. Infrared value I, like brightness value L, can therefore assume only values from 0 to 100. Color values L, a, b and infrared value I are calculated from spectral reflectance values in computer C. For the sake of completeness, it should be pointed out that color values L, a, b (or corresponding values for another color space) could also be determined using a suitable calorimeter without spectral scanning.

Color values L, a, b and infrared values I obtained after scanning a pixel form the starting point for calculating ink coverages $A_C$, $A_Y$, $A_M$, $A_S$ of the pixel with respect to cyan, yellow, magenta and black printing inks. Value quadruplets, including three color values L, a, b (or the corresponding values of another color system) and infrared value I are referred to below as (four-dimensional) color vector F=(L, a, b, I) of the respective pixel. The color locus in the four-dimensional color space is understood to refer to a point in the four-dimensional color space whose four coordinates are the four components of color vector F.

The visual color perception (the color locus or color vector in terms of measurement technology) of a pixel in offset screen printing is determined by the ink coverages (percentage screen values) of the printing inks involved and, to a lesser extent, by the layer thickness of the printing inks. The screen values or ink coverages (0–100%) are defined by the printing plates used and are practically invariable. Under given printing conditions, it is possible to influence the perceived color and thereby regulate it essentially only through the layer thicknesses of the printing inks involved. The terms "screen value" and "ink coverages" are used synonymously below. The totality of all possible combinations R of ink coverages or screen values of the printing inks involved (usually cyan, yellow, magenta, black) shall be referred to below as the screen space (four dimensional).

Under given printing conditions (characteristic curves of the printing press, nominal layer thicknesses, stock to be printed, printing inks used, etc.) each screen value combination R corresponds to a precisely defined perceived color or color vector F of the pixel printed with this screen value combination R; thus, there is an unambiguous allocation of screen value combination R to color locus or color vector F; the screen space can be mapped unambiguously onto the color space, although the color space is not occupied completely, because it also contains unprintable color loci. There is not generally an unambiguous inverse relationship. Color vector F belonging to any screen value combination R can be determined empirically by trial printings or by a suitable mathematical printing model which describes the printing method under the given printing conditions with sufficient accuracy. A suitable model is given, for example, by the known Neugebauer equations for offset printing. This model presupposes a knowledge of the reflectance spectra of single-color full tones, some overlayered printing of full tones and some screen fields of all the printing inks involved in the printing with the nominal layer thicknesses of the printing inks. These reflectance spectra can be measured very easily on the basis of a trial printing. If the characteristic curves of the printing press are known, simple measurements of full tones are also sufficient.

According to another idea of the present invention, the screen space is quantized for calculation of the screen value combinations or ink coverages. Therefore, a number of, for example, 1296 equidistant discrete screen value combinations $R_{iR}$ (six discrete screen percentage values $A_C$, $A_Y$, $A_M$, $A_S$ each for the printing inks cyan, yellow, magenta, black) are defined in the screen space:

| i | 0 | 1 | 2 | 3 | 4 | 5 |
|---|---|---|---|---|---|---|
| $A_C$ | 0 | 20 | 40 | 60 | 80 | 100% |
| $A_Y$ | 0 | 20 | 40 | 60 | 80 | 100% |
| $A_M$ | 0 | 20 | 40 | 60 | 80 | 100% |
| $A_S$ | 0 | 20 | 40 | 60 | 80 | 100% |

These 1296 discrete screen value combinations $R_{iR}$ are numbered with a unique screen index iR according to the following formula:

$$iR = i(A_C)*5^0 + i(A_Y)*5^1 + i(A_M)*5^2 + i(A_S)*5^3$$

The terms $i(A_C)$ ... are understood to indicate the value of index i for the respective discrete screen value of the respective printing ink. A color vector $F_{iR}$ is determined for each of these 1296 discrete screen value combinations $R_{iR}$ on the basis of the above-mentioned printing model, for example, or on the basis of trial printings, and these color vectors are filed in an allocation table, referred to below as screen color table RFT. Thus, screen color table RFT contains a total of 1296 discrete screen value combinations $R_{iR}$ and 1296 corresponding color vectors $F_{iR}$.

The screen space is preferably quantized in two steps. In the first step, the corresponding color vectors are calculated for only 256 discrete screen value combinations (corresponding to four discrete screen percentage values 0%, 40%, 80%, 100% for each of the printing inks cyan, yellow, magenta, black) on the basis of the above-mentioned offset printing model. Then, in the second step, the corresponding color vectors are calculated for the missing screen percentage values 20% and 60% by linear interpolation from the color vectors belonging to the sixteen nearest discrete screen value combinations. This again yields a total of 1296 discrete screen value combinations $R_{iR}$ with 1296 corresponding discrete color vectors $F_{iR}$. Of course, a larger or smaller number of discrete screen combinations, e.g., approximately 625 or 2401, could also be defined in the screen space, but the number 1296 represents an optimum compromise between accuracy and computation expense for practical purposes.

Ink coverages $A_C$, $A_Y$, $A_M$, $A_S$ are now determined by selecting from the 1296 color vectors filed in screen color table RFT the nearest color vector to four-dimensional color vector F determined for the pixel and assigning to the pixel the discrete screen value combination $R_{iR}$ belonging to this color vector. If desired, interpolation may also be performed.

According to an especially advantageous embodiment of the present invention, the color space (four-dimensional when including infrared value I) is subjected to a quantization for determination of ink coverages $A_C$, $A_Y$, $A_M$, $A_S$ or screen value combination R from color vector F of the pixel, i.e., the color space is divided into a number of subareas by defining a number of discrete color loci with discrete coordinates in the color space. The four-dimensional color space can be quantized, for example, by the fact that each dimension L, a, b, I of the color space can assume only eleven discrete values, which yields a total of 14,641 discrete color loci $F_{iF}$:

| i | 0 | 1 | 2 | 3 | 4 | 5 | 6 | 7 | 8 | 9 | 10 |
|---|---|---|---|---|---|---|---|---|---|---|----|
| L | 0 | 10 | 20 | 30 | 40 | 50 | 60 | 70 | 80 | 90 | 100 |
| a | −75 | −60 | −45 | −30 | −15 | 0 | 15 | 30 | 45 | 60 | 75 |
| b | −45 | −30 | −15 | 0 | 15 | 30 | 45 | 60 | 75 | 90 | 105 |
| I | 0 | 10 | 20 | 30 | 40 | 50 | 60 | 70 | 80 | 90 | 100 |

These 14,641 discrete color loci $F_{iF}$ are numbered with a unique color locus index iF:

$$iF=i(L)*11^0+i(a)*11^1+i(b)*11^2+i(I)*11^3$$

According to another especially advantageous computation method which is explained below, the corresponding screen value combinations $R_{iF}$ are calculated for these discrete color loci $F_{iF}$ of the color space and are saved in a mutually allocated form in a color-ink coverage table FFT.

For the purposes of determination of ink coverages $A_C$, $A_Y$, $A_M$, $A_S$ described by screen value combination R from color vector F, which is determined for the pixel, color vector F is replaced by the nearest discrete color locus $F_{iF}$, and screen value combination $R_{iF}$ corresponding to this discrete color locus $F_{iF}$ is obtained from color-ink coverage table FFT. This screen value combination $R_{iF}$ then represents ink coverages $A_C$, $A_Y$, $A_M$, $A_S$ sought for the pixel.

According to another advantageous idea of the present invention, screen value combinations $R_{iF}$ determined for discrete color loci $F_{iF}$ may be replaced by nearest discrete screen value combination $R_{iR}$ of screen color table RFT, if they do not coincide with a discrete screen value combination $R_{iR}$ of screen color table RFT. This yields a unique, precalculated mapping of 14,641 discrete color loci $F_{iF}$ of the (four-dimensional) color space on 1296 discrete screen value combinations $R_{iR}$ of the screen space. This mapping is calculated in advance, as already indicated, and is stored in an allocation table, referred to below as screen index table RIT.

For the purpose of determining ink coverages $A_C$, $A_Y$, $A_M$, $A_S$ described by screen value combination R from color vector F determined for the pixel, color vector F is in turn replaced by nearest discrete color locus $F_{iF}$, and discrete screen value combination $R_{iR}$ allocated to this discrete color locus $F_{iF}$ is obtained from screen index table RIT. This discrete screen value combination $R_{iR}$ then represents ink coverages $A_C$, $A_Y$, $A_M$, $A_S$ sought for the pixel.

For the preceding discussion, it was assumed that screen value combinations R can be calculated from color vectors F. The following embodiments concern the manner in which this can be accomplished to particular advantage according to the present invention.

First, the color space is subdivided into 81 subareas $T_{iT}$ as follows:

| i | 0 | 1 | 2 |
|---|---|---|---|
| L(0..120) | 0..20..40 | 40..60..80 | 80..100..120 |
| A(−90..+90) | −90..−60..−30 | −30..0..+30 | +30..+60..+90 |
| b(−60..+120) | −60..−30..0 | 0..+30..+60 | +60..+90..+120 |
| I(0..120) | 0..20..40 | 40..60..80 | 80..100..120 |

The total of 81 subareas $T_{iT}$ are numbered continuously and uniquely by a subarea index iT defined according to the following formula:

$$iT=i(L)*3^0+i(a)*3^1+i(b)*3^2+i(I)*3^3$$

Within each subarea $T_{iT}$ the relationship between color vector F and respective screen value combination R, which is written as screen value vector $A=(A_C, A_Y, A_M, A_S)$, is linearly approximated by the following equivalence model:

$$A=U_{iT}*F$$

where A denotes the screen value vector with screen values or ink coverages $A_C$, $A_Y$, $A_M$, $A_S$ of the four printing inks involved as components, and $U_{iT}$ denotes a conversion matrix for respective subarea $T_{iT}$ of the color space with 16 coefficients which are the partial derivatives (gradients) of the screen value vector components with respect to the color vector components. If conversion matrices $U_{iT}$ of individual subareas $T_{iT}$ are known, corresponding screen value vector A or corresponding screen value combination R can be calculated for each color vector F. It is thus possible to calculate corresponding screen value combinations $R_{iF}$ for all discrete color loci $F_{iF}$.

The task is thus reduced to calculating conversion matrices $U_{iT}$ for individual subareas $T_{iT}$ or, more precisely, for color vectors $F_{iT}$ of their midpoints. This calculation of conversion matrices is performed using an essentially known, weighted, linear regression equation using the values of screen color table RFT explained above, i.e., 1296 discrete screen value combinations $R_{iR}$ and corresponding discrete color vectors $F_{iR}$ as interpolation points. Essentially only the inversion of a 4×4 matrix is required per subarea $T_{iT}$ for the regression equation. The weighting of the interpolation points, i.e., discrete screen value combinations $R_{iR}$ with corresponding discrete color loci $F_{iR}$ of screen color table RFT, for the regression equation is determined according to a suitable function with the color difference between the interpolation points and respective color vector $F_{iT}$ as parameter. The regression equation is linear, i.e., there are discontinuities at the transitions of individual subareas $T_{iT}$, but they are irrelevant for practical purposes. Those skilled in the art are familiar with the mathematical methods of the weighted linear regression calculation, and therefore no further explanation is required.

DETAILED DESCRIPTION

Figure 1:
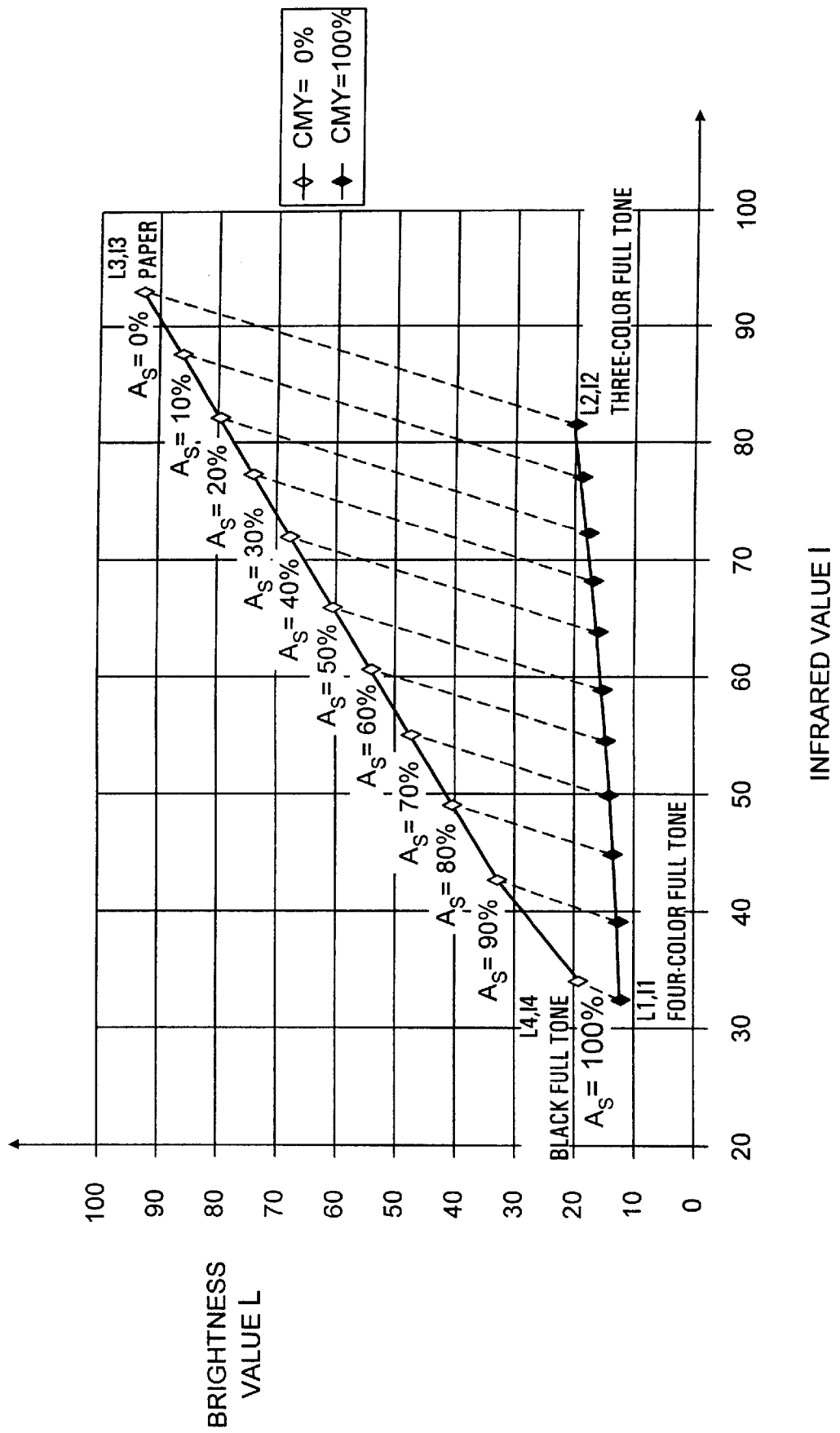
FIG. 1 shows brightness L as a function of infrared value I for the extremes of printing only with black printing ink ($A_C=A_M=A_Y=0$) and of printing black with chromatic colors with ink coverages of $A_C=A_Y=A_M=100\%$.
Figure 2:
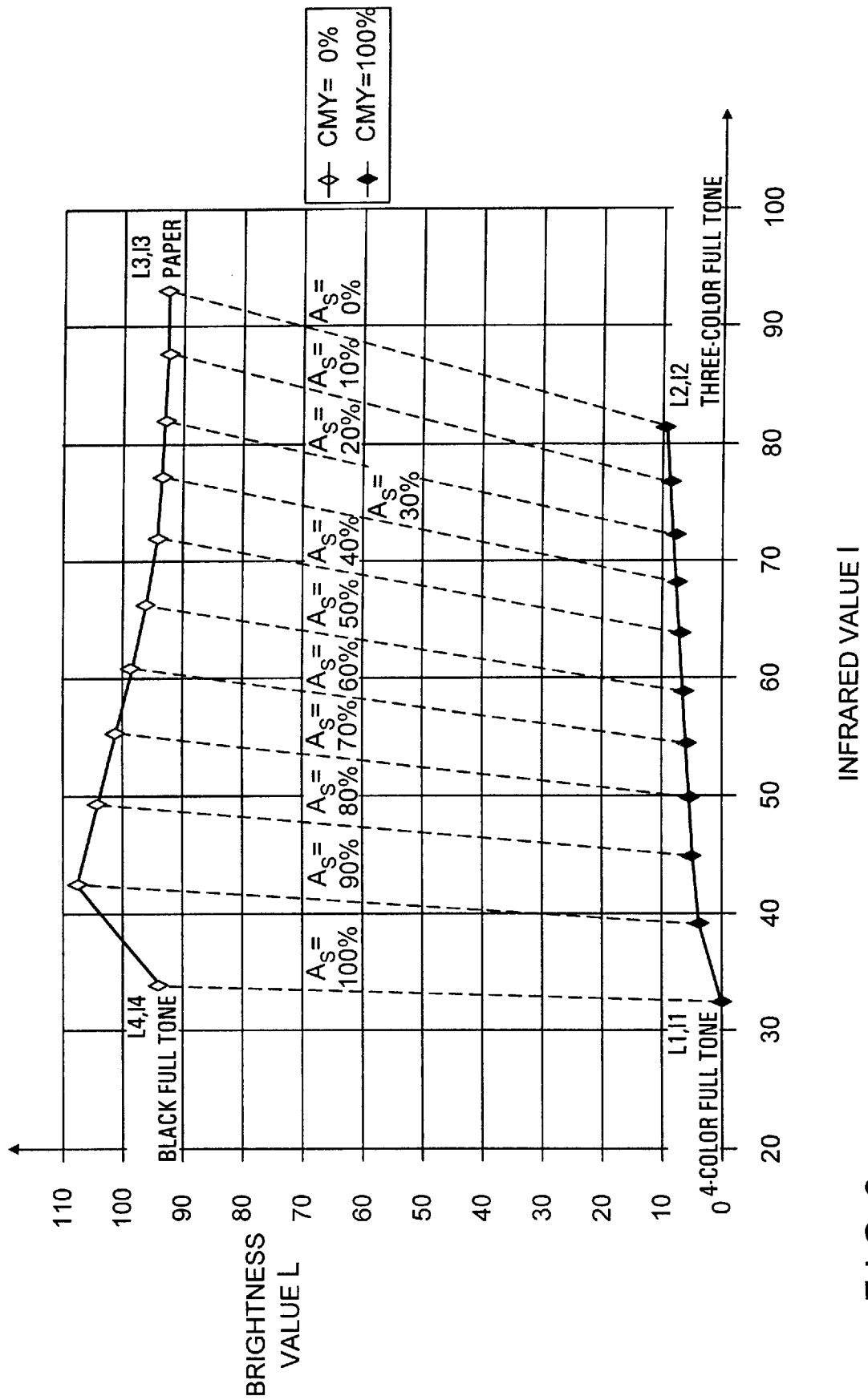
FIG. 2 shows a brightness L plotted as a function of the infrared value I after the value-correction has taken place.

On the basis of FIGS. 1 and 2, an embodiment of the method of the present invention is described, where color values L, a, b are corrected as a function of infrared values I to determine ink coverages $A_C$, $A_Y$, $A_M$ and $A_S$ of the printing inks involved here. For transformation of color values L, a, b, I into ink coverage values $A_C$, $A_Y$, $A_M$ and $A_S$, corresponding color values L, a, b, I are calculated in a first step on the basis of a model, for example, for predetermined ink coverage values $A_C$, $A_Y$, $A_M$, $A_S$. As described above in detail, from these color values L, a, b, I, ink coverage values $A_C$, $A_Y$, $A_M$, $A_S$ are calculated for discrete color values L, a, b, I. However, there are many areas that are not printable because discrete color values L, a, b, I are preferably equidistant. This concerns in particular areas with a low infrared value I, because a certain brightness L as a function of infrared value I cannot be exceeded here. FIG. 1 shows brightness L as a function of infrared value I for the extremes of printing only with black printing ink ($A_C = A_M = A_Y = 0$) and of printing black with chromatic colors with ink coverages of $A_C = A_Y = A_M = 100\%$.

It can be seen clearly that the brightness area is very limited at low infrared values I. Assuming a quantization of 10 in infrared value I and in brightness L, then resolution of the chromatic component is no longer possible when I<40. To prevent this, color value L is transformed as a function of infrared component I as follows:

$$L_{new} = \frac{L - L_1}{(L_4 - L_1) + \left\{(L_3 - L_4) * \frac{(I - I_4)}{(I_3 - I_4)}\right\}} * L_3$$

where $L_{new}$ is the corrected brightness component of a color value, L1 is the brightness of a full-tone field created by superimposed printing of all the printing inks involved, L3 is the brightness of the print, L4 is the brightness of a full-tone field created with black ink, I4 is the infrared value of a full-tone field created with black ink, and I3 is the infrared value of the print. Color value L is corrected, as shown in FIG. 2. It can be seen from FIG. 2 that nine to ten quantization steps are available for all infrared values. Color values a, b also are corrected as described for color value L.

What is claimed is:

1. A method of determining ink coverages of printing inks involved in printing in a pixel of a print image comprising:

scanning the pixel photoelectrically in a visible range of a spectrum to obtain scanning signals;

forming color coordinates of a perceptually approximately equidistant color system as a function of the scanning signals;

scanning the pixel photoelectrically in a near infrared range of the spectrum to form at least one infrared scanned signal;

forming at least one infrared value from the at least one infrared scanned signal and defining an additional color coordinate as a function of the at least one infrared value; and calculating the ink coverages as a function of the color coordinates and the additional color coordinate.

2. The method as recited in claim 1 wherein the calculating the ink coverages step includes correcting the color coordinates as a function of the at least one infrared value.

3. The method as recited in claim 2 wherein the calculating the ink coverages step includes deriving ink coverage values from a table, the ink coverage values being allocated in the table as a function of preliminary color coordinates and at least one preliminary infrared value.

4. The method as recited in claim 3 wherein the table is calculated as a function of measured values on full-tone areas printed with a printing press using a mathematical model of the printing press used to produce the print image, the table also being calculated as a function of characteristic curves of the printing press.

5. The method as recited in claim 3 wherein the table is formed by calculating the preliminary color coordinates and the at least one preliminary infrared value for a plurality of different discrete ink coverage combinations of the printing inks so as to form a screen color table; and wherein the calculating the ink coverages step includes deriving the ink coverages from the screen color table.

6. The method as recited in claim 3 wherein the table is formed using a four-dimensional color space with coordinates including the preliminary color coordinates and the at least one preliminary infrared value by defining a number of discrete color loci in the four-dimensional color space and calculating respective ink coverages of the printing inks involved in the printing for each of the discrete color loci so as to form a color-ink coverage table; and wherein the calculating the ink coverages step includes forming coordinates of a color locus in the four-dimensional color space as a function of the color coordinates and the at least one infrared value, identifying a nearest discrete color locus to the color locus, and obtaining the ink coverages as a function of the nearest discrete color locus and the color-ink coverage table.

7. The method as recited in claim 5 further comprising forming a screen index table using a four-dimensional color space with coordinates including the preliminary color coordinates and the at least one preliminary infrared value, a number of discrete color loci being defined in this four-dimensional color space, and respective ink coverages of the printing inks involved in the printing being calculated for each of the discrete color loci and replaced by nearest discrete ink coverage combinations of the screen color table so as to form the screen index table; and wherein the calculating the ink coverages step includes forming coordinates of a color locus in the four-dimensional color space as a function of the color coordinates and the at least one infrared value, identifying a nearest discrete color locus to the color locus, and obtaining the ink coverages as a function of the nearest the discrete color locus and the screen index table.

8. The method as recited in claim 6 wherein the four-dimensional color space is divided into a plurality of subareas, and the respective ink coverages are calculated from the discrete color loci defined in the color space for the discrete color loci of one of the plurality of subareas using a linear equivalence model of a relationship between a respective color locus and the respective ink coverages.

9. The method as recited in claim 7 wherein the four-dimensional color space is divided into a plurality of subareas, and the respective ink coverages are calculated from the discrete color loci defined in the color space for the discrete color loci of one of the plurality of subareas using a linear equivalence model of a relationship between a respective color locus and the respective ink coverages.

10. The method as recited in claim 5 wherein a linear equivalence model is formed by a matrix whose coefficients are calculated by a weighted regression equation with values of the screen color table as interpolation points.

11. The method as recited in claim 8 wherein the linear equivalence model is formed by a matrix whose coefficients are calculated by a weighted regression equation with values of the screen color table as interpolation points.

12. The method as recited in claim 9 wherein a linear equivalence model is formed by a matrix whose coefficients are calculated by a weighted regression equation with values of the screen color table as interpolation points.

* * * * *